UNITED STATES PATENT OFFICE.

GOTTLOB SCHOPF, OF STUTTGART, GERMANY.

BUILDING MATERIAL AND PROCESS OF MAKING SAME.

SPECIFICATION forming part of Letters Patent No. 575,379, dated January 19, 1897.

Application filed March 21, 1896. Serial No. 584,330. (No specimens.)

*To all whom it may concern:*

Be it known that I, GOTTLOB SCHOPF, joiner, residing at Bahnhofstrasse 77, Stuttgart, Germany, have invented a new and useful Building Material and Process for Making the Same, of which the following is a specification.

My invention relates to an improved composition for building material and to a process for producing the same.

The object of my invention is to produce building-stones, tiles, slabs, sills, or other similar building materials which will be light and have great supporting and resisting strength, and whose main ingredient consists of organic substances—e. g., comminuted wood, tanbark, straw, dry leaves of trees, seaweeds, pine or fir needles, and the like. These substances are mingled together with a semifluid mixture of warm glue, soluble glass, powdered clay, and whiting, to which may be added asbestos, then pressed into molds, and the molded articles are dried either in the air or by special drying apparatus, whereby they are caused to petrify. A petrified product is thus obtained which is light, extremely hard, tough, and capable of great resistance and of great bearing capacity. This product, after having become dry on the surface, is covered with a coat consisting of warmed liquid soluble glass, whiting, and asbestos, if desired. The pores still existing on the surface are thus filled and the coat rapidly becomes as hard as glass, so that the molded articles resist all climatic influences in a durable manner.

The process is carried out as follows: If to three parts, by weight, thin liquid glue one part of soluble glass is added, while continually heating, the liquid condition of the mixture is partially lost. By adding a further mixture of three parts powdered clay, two parts whiting, and, if desired, one part of asbestos to the former continuously-heated mass and energetically working together the two mixtures a semifluid pulp is obtained. Into the latter are now introduced from six to eight parts of organic substances, which preferably consist of comminuted wood—e. g., shavings—and energetically kneaded or worked into the pulp until every individual woody part is completely covered by the mass. A mass is thus obtained which at first is still plastic and which is brought from the mixing vessel into the desired molds and there pressed with greater or less power, according as it is desired to obtain a more or less porous product or a more or less smooth surface. After pressing, the articles are removed from the molds and dried in the air, which requires from two to four days, according to their thickness.

If it is desired to hasten the drying operation, the same may be carried out by special drying apparatus. In drying, a gradual petrifaction of the articles, beginning at the surface, takes place, so that they become extremely hard, tough, and capable of great resistance and sustaining power and yet possess a low specific gravity, which, according to the extent of pressure, varies from 1 to 1.3.

The woody parts during the working of the hereinbefore-described mass, as well as the subsequent pressing, are caused to lie in all directions, lengthwise and crosswise, and to be in all parts of the molded articles, and hence also at their surface. A cracking of such molded articles or a crumbling or fracture of the same in transit is thereby avoided. Such molded articles, moreover, permit durable nailing, inasmuch as a nail driven into the same penetrates a large number of woody fragments, held fast in their position by the petrifaction, and retains them almost the same as in a plank of timber.

After the molded articles have become completely petrified, on their surface at least, they are coated with a mixture of one part heated soluble glass and three parts whiting, to which one part of asbestos may be added. This coating has the purpose of providing the molded articles at their surfaces with a quick-drying, air-proof covering which is as hard and smooth as glass. This coat, moreover, has the property that on assembling the molded pieces they may be well cemented together with ordinary mortar. When, however, a mortar which is composed of glue, powdered clay, soluble glass, whiting, and asbestos is employed, especially in a warm condition, the parts will adhere together as firmly as though the wall made from them were made in one piece, so that even in the settling of houses constructed with such walls, ceilings, &c., a cracking of the walls or breaking of their several parts does not occur, the entire wall acting as one support.

According to the mode of employing the molded parts obtained according to the hereinbefore-described process they are provided with a more or less smooth surface, or the same may be ground more or less smooth. For intermediate floors or ceilings which are to be separately plastered their surface is left rough, as the plastering adheres more firmly in this way.

If it is desired to directly paper or paint the walls, ceilings, &c., made from these molded parts, their surface is ground more or less smoothly. Wall-paper and oil-colors also adhere very firmly to ceilings and walls made from such molded pieces.

In consequence of their extraordinary bearing capacity these molded parts are particularly adapted for the construction of ceilings and arches. The vitreous coating of the molded stones protects them against injury by the weather, vermin, &c. Their specific gravity being less than that of most other artificial stones, (from 1 to 1.3,) these molded stones are adapted for the building of light partition-walls, as also for temporary buildings or such as are to be rapidly constructed, for barracks and hospitals, &c. Also for floors in factories, halls, &c., slabs or plates obtained by the above process are, by virtue of their elasticity, more suitable than the hard floors of stone slabs, cement, or beton.

Having thus fully described my invention, what I claim as new, and desire to secure by Letters Patent, is—

1. A process for making artificial building material which consists in adding soluble glass to heated liquid glue and continuing the heating, then adding powdered clay and whiting and continuing the heating of the mixture, then adding an organic substance, and finally molding the composition into the desired form, substantially as described.

2. A process for making artificial building material which consists in adding soluble glass to heated liquid glue and continuing the heating, then adding powdered clay and whiting and continuing the heating of the mixture, then adding an organic substance, next molding the composition into form, then drying and finally coating the articles with soluble glass and whiting, substantially as described.

3. A composition for building material, consisting of liquid glue, soluble glass, powdered clay, whiting and organic substances, substantially as described.

4. A composition for building material consisting of three parts liquid glue, one part soluble glass, three parts powdered clay, two parts whiting and six to eight parts of organic substances, substantially as described.

5. A composition for building material consisting of a mixture of liquid glue and soluble glass, with clay, whiting, asbestos and organic substances, substantially as described.

In testimony whereof I have signed this specification in the presence of two subscribing witnesses.

GOTTLOB SCHOPF.

Witnesses:
  AUGUST B. DRANTZ,
  CHRISTIAN BAUER.

German patent to Kirchner et al., 20,697, Dec. 29, 1881, Roofing Felt, Asbestus.
British patents to Mignot, 1859 of 1866, and Straub, 7206 of 1888,
Koskul, 200,834, Mar 5, 1878, S.L. & C. Comp.

Guelton, 290,417, Dec. 18, 1883, S.L. & C. Processes.